(12) United States Patent
Haas et al.

(10) Patent No.: US 7,760,836 B2
(45) Date of Patent: *Jul. 20, 2010

(54) SKEW-CORRECTING APPARATUS USING EXTERNAL COMMUNICATIONS ELEMENT

(75) Inventors: Wally Haas, Mount Pearl (CA); Mutema John Pittman, St. John's (CA); Chuck Rumbolt, St. John's (CA)

(73) Assignee: Avalon Microelectronics, Inc., Mount Pearl (CA)

( * ) Notice: Subject to any disclaimer, the term of this patent is extended or adjusted under 35 U.S.C. 154(b) by 827 days.

This patent is subject to a terminal disclaimer.

(21) Appl. No.: 11/462,164

(22) Filed: Aug. 3, 2006

(65) Prior Publication Data

US 2008/0126888 A1 May 29, 2008

(51) Int. Cl.
*H03L 7/00* (2006.01)
(52) U.S. Cl. .................. 375/367; 375/260; 375/279
(58) Field of Classification Search .......... 375/367, 375/226; 714/700–717
See application file for complete search history.

(56) References Cited

U.S. PATENT DOCUMENTS

| | | | |
|---|---|---|---|
| 6,079,035 A | 6/2000 | Suzuki et al. | |
| 6,201,831 B1 | 3/2001 | Agazzi et al. | |
| 6,336,192 B1 | 1/2002 | Sakamoto et al. | |
| 6,557,110 B2 * | 4/2003 | Sakamoto et al. | 713/503 |
| 6,618,395 B1 * | 9/2003 | Kimmitt | 370/473 |
| 6,690,757 B1 * | 2/2004 | Bunton et al. | 375/371 |
| 6,820,234 B2 | 11/2004 | Deas et al. | |
| 6,834,255 B2 | 12/2004 | Abrosimov et al. | |
| 6,839,862 B2 | 1/2005 | Evoy et al. | |
| 6,907,552 B2 * | 6/2005 | Collins | 714/700 |
| 6,920,576 B2 | 7/2005 | Ehmann | |
| 6,937,681 B2 * | 8/2005 | Watanabe | 375/371 |
| 6,996,738 B2 | 2/2006 | Chiang | |
| 7,012,935 B2 | 3/2006 | Woelk et al. | |
| 7,093,172 B2 | 8/2006 | Fan et al. | |
| 7,124,334 B2 * | 10/2006 | Kashiwakura | 714/712 |
| 7,209,907 B2 * | 4/2007 | Cherukuri et al. | 706/16 |
| 7,363,563 B1 | 4/2008 | Hissen et al. | |
| 7,401,246 B2 * | 7/2008 | Martin et al. | 713/500 |
| 7,496,803 B2 * | 2/2009 | Khondker et al. | 714/700 |
| 7,536,579 B2 * | 5/2009 | Haas et al. | 713/500 |
| 7,546,494 B2 * | 6/2009 | Haas et al. | 714/700 |
| 2003/0142772 A1 * | 7/2003 | Weiss et al. | 375/372 |

(Continued)

OTHER PUBLICATIONS

Optical Internetworking Forum (OIF), System Framer Interface Level 5 (SFI-5), Jan. 29, 2002.

(Continued)

*Primary Examiner*—Chieh M Fan
*Assistant Examiner*—Santiago Garcia

(57) ABSTRACT

An apparatus for determining the amount of skew to be injected into a high-speed data communications system of including a plurality of lanes having a data bus per lane, relative to a reference lane, for system skew compensation. By knowing the relative amount of skew that each lane requires for alignment, an appropriate amount of skew can be injected on each lane to provide alignment and thus compliancy with the SFI-5 and SxI-5 standards, in terms of data skew specifications. The relative skew amounts for each transmitting lane are determined using a methodology involving internal loopback and characteristics from a connected communications element to the chip receive path.

9 Claims, 2 Drawing Sheets

U.S. PATENT DOCUMENTS

| | | | |
|---|---|---|---|
| 2004/0064765 A1* | 4/2004 | Panis | 714/700 |
| 2004/0123190 A1* | 6/2004 | Toyoda et al. | 714/700 |
| 2004/0136411 A1* | 7/2004 | Hornbuckle et al. | 370/537 |
| 2005/0005051 A1* | 1/2005 | Tseng | 710/310 |
| 2005/0005184 A1* | 1/2005 | Lindt | 713/500 |
| 2005/0114724 A1* | 5/2005 | Wu | 713/401 |
| 2005/0163044 A1* | 7/2005 | Haq et al. | 370/219 |
| 2007/0088991 A1* | 4/2007 | Shin et al. | 714/700 |
| 2008/0031311 A1 | 2/2008 | Haas et al. | |
| 2008/0031312 A1 | 2/2008 | Haas et al. | |

OTHER PUBLICATIONS

Optical Internetworking Forum (OIF), System Interface Level 5 (Sxl-5), Oct. 2002.

* cited by examiner

SKEW-CORRECTING APPARATUS USING EXTERNAL COMMUNICATIONS ELEMENT

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

1. Field of the Invention

The present invention relates to chip-to-chip high speed data communications and the detection and correction of skew in each transmit channel, relative to a reference channel.

2. Description of Related Art

Parallel transmission, as defined with respect to the present invention, is the serial transmission of data over a plurality of lines on a data bus. In this parallel data transmission, skew can be added to each serial data lane through such means as serialization, cross-clock domain crossing, or through static skew parameters such as trace length. This skew can result in different alignments between lines of the data bus. Thus, there is an obvious need to correct this skew, or to deskew the data lines. If the amount of skew added on each line can be found, then a skew injecting apparatus that can compensate for the skew added on each line can eliminate the problem, and thus adhere to relevant standards which specify skew requirements.

The following system description is applicable to any chip-to-chip high speed communications system where skew compensation may be of benefit. Specific standards mentioned throughout, such as SFI-5 and Sxl-5, should be considered examples and are in no way exhaustive.

One of the standards describing the objectives and requirements of a multi-bit bus for use in the interconnection between devices in communications systems with up to 50 Gb/s optical links is published by the Optical Internetworking Forum: Serdes Framer Interface Level 5 (SFI-5): Implementation Agreement for 40 Gb/s Interface for Physical Devices, with Serdes referring to Serialization and Deserialization (Dartnell, Lerer & Lynch, 2002). The electrical I/O characteristics of this interface are defined in the standard System Interface Level 5 (Sxl-5): Common Electrical Characteristics for 2.488-3.125 Gbps Parallel Interfaces (Palkert & Lerer, 2002).

The SFI-5 bus has a 16-bit wide data bus with each channel operating at up to 3.125 Gb/s with a Deskew, or Parity, Channel. The Serdes component of the communications system thus requires 17 transceivers to handle these 17 lanes. Each one of these transceivers may have different skew characteristics and therefore may cause misalignment to the standard when transmitting data.

BRIEF SUMMARY OF THE INVENTION

To compensate for the skew differences between each individual lane on the transmit side, skew can be injected by the system into each individual lane to re-align the data. In order to determine how much skew should be injected by the system into each lane, the skew characteristics for each transmitter lane must be known. Using internal loopback techniques and the characteristics of the receive path (from the connected communications element to the receiving chip), these skew characteristics can be determined for each transmitter lane, and once known, can be corrected using skew injection techniques.

This is different from the current systems on the market that involve grouping bus lines with each group having its own clock domain (U.S. Pat. No. 6,839,862, Evoy, Pontius & Ehmann, 2005) or by using multiple synchronization codes (U.S. Pat. No. 6,920,576, Ehmann, 2005). As Evoy et al. describe, "by grouping the bus lines in groups with each group having its own clock domain, skew across clock-domain groups is tolerated and overcome by processing the data and the skew first within each clock domain group, and then between groups." Ehmann's solution "overcomes skewing problems by transferring digital data with automatic realignment," i.e., using synchronization codes.

The proposed system of the present invention uses neither separate clock domains for bus line groups, nor adds synchronization codes, but rather employs internal loopback, combined with information collected from the connected communications element received path, to determine skew characteristics for each bus line. The skew can then be corrected by injecting offsetting skew amounts into the individual bus lines to re-align the data according to a single reference lane, thus eliminating any skew related problems and meeting all relevant standards.

DETAILED DESCRIPTION OF THE INVENTION

On the transmit side, skew can be injected on a per-lane basis to compensate for any skew added by the system, such as Field Programmable Gate Array (FPGA) startup conditions. This injected skew achieves compliancy as specified by applicable standards, such as Sxl-5. To determine how much skew should be injected to meet these standards, the following system is implemented.

The present invention consists of N+1 transceivers for the purposes of data transmission and reception. Each transceiver consists of a receiver-transmitter pair and a datapath between transmitting lane and receiving lane to permit internal loopback from transmitter to receiver A switch on the receive path allows the receiver to receive either this looped-back data or regularly-received data. The system is designed such that internal loopback, combined with information collected from the receive path, can be used to determine the necessary per-lane skew to be added for total lane alignment.

The term "receive path," as used herein, refers to the path from the connected communications element to the receiving chip, where the receiving chip may be an FPGA. The connected communications element may be an optical transponder or some other connection device for the purpose of data transfer.

A person skilled in the art will understand that it is necessary for one of the transceivers to be chosen as the reference. This reference transceiver can be chosen as one of the active transceivers or may be a transceiver used solely for the purpose of providing a reference. All other lanes will have their skew determined relative to this reference.

The system of the present invention enables the calculation of the skew for each transmit lane, relative to one of the lanes. The following example will illustrate the workings of a possible system mathematically. This example will deal with a smaller 3 transceiver systems. The 3 transceiver example is easily expandable into an SFI-5 system with 17 transceivers, or any other transceiver-based system. Transceivers are herein also referred to as MGTs (Multi-Gigabit Transceivers).

The following example is set forth to gain a better understanding of the skew-detection portion of the invention described herein. This example is provided for illustrative purposes only and should not limit the scope of this invention in any way.

EXAMPLE 1

Internal Loopback with Receive Path Information

Figure 1:
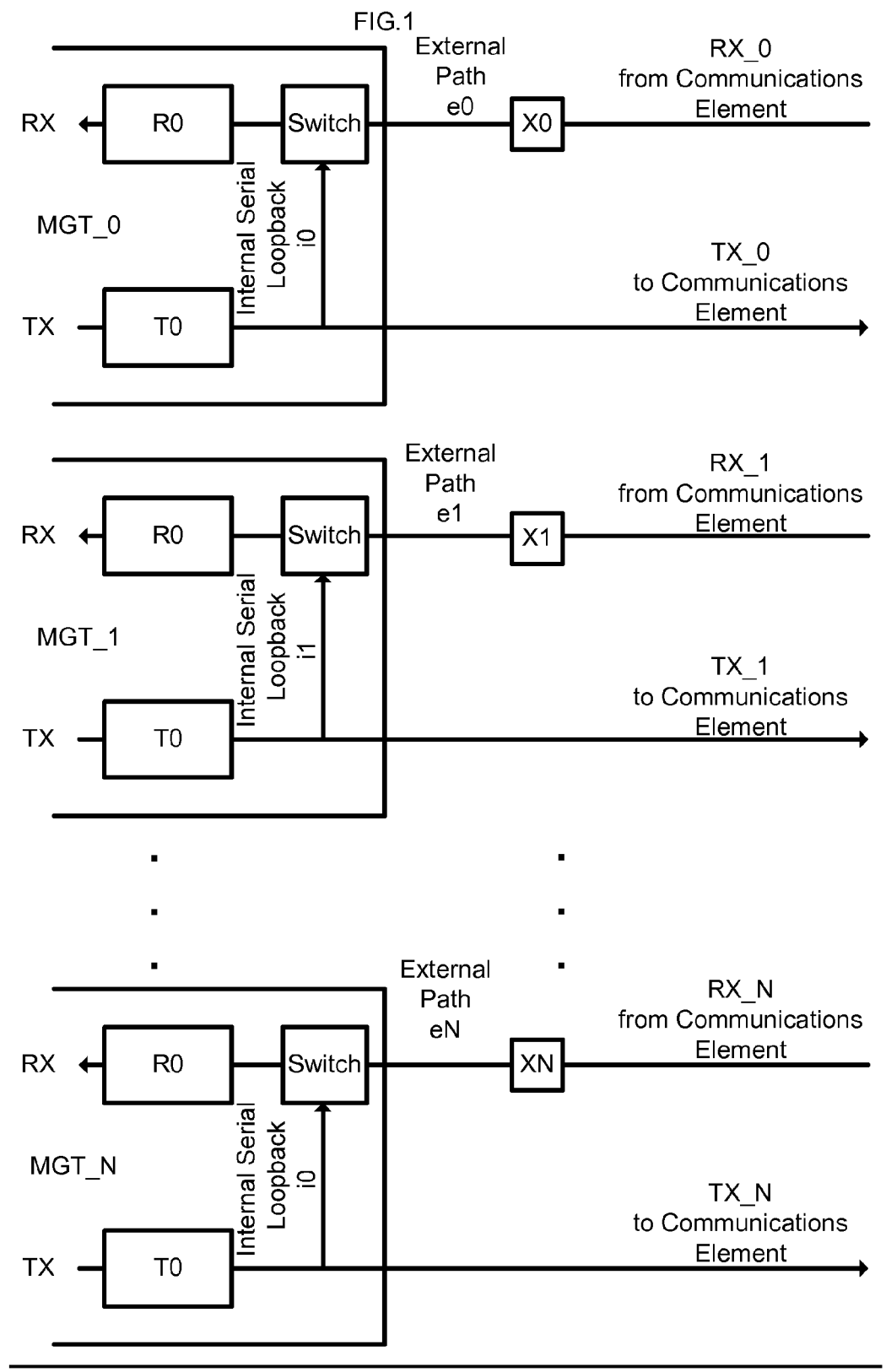
FIG. 1 is a block diagram of how the deskew algorithm may be implemented if using internal loopback and the receive path to determine relative skew differences between lanes.

The system in this case is implemented using internal loopback and the information collected from the receive path from a single transceiver, that information being looped back from transmitter to receiver in that transceiver via a switch in the receive path, as shown in FIG. 1. The skew data from each transceiver will be used in conjunction with the data from the other transceivers to determine skew between each lane, and thus be able to correct it.

In Example 1, internal loopback is used in conjunction with the receive path to determine the relative skew amounts for each lane as illustrated in FIG. 1. The variables and constants used in this example are defined as:

Definition List 1

| Term | Definition |
|---|---|
| R0 | Unknown receive skew for MGT_0 |
| R1 | Unknown receive skew for MGT_1 |
| R2 | Unknown receive skew for MGT_2 |
| T0 | Unknown transmit skew for MGT_0 |
| T1 | Unknown transmit skew for MGT_1 |
| T2 | Unknown transmit skew for MGT_2 |
| X0 | Unknown external skew for path from communications element to MGT_0 |
| X1 | Unknown external skew for path from communications element to MGT_1 |
| X2 | Unknown external skew for path from communications element to MGT_2 |
| i0 | Known internal skew constant for MGT_0 |
| i1 | Known internal skew constant for MGT_1 |
| i2 | Known internal skew constant for MGT_2 |
| e0 | Known external skew constant for entire receive path of MGT_0 |
| e1 | Known external skew constant for entire receive path of MGT_1 |
| e2 | Known external skew constant for entire receive path of MGT_2 |

Constants i0, i1, i2, e0, e1 and e2 may be determined through empirical means, such as testing with a training sequence. The training sequence may be implemented as a Pseudo-Random Bit Sequence (PRBS) pattern. This empirical information is collected by the receiver.

With reference to FIG. 1, the following equations can be formulated:

$$R0+X0=e0 \quad (1)$$

$$T0+R0=i0 \quad (2)$$

$$R1+X1=e1 \quad (3)$$

$$T1+R1=i1 \quad (4)$$

$$R2+X2=e2 \quad (5)$$

$$T2+R2=i2 \quad (6)$$

From equations (1) and (2), R0 can be equated, giving:

$$e0-X0=i0-T0$$

Therefore, $$T0=i0-e0+X0$$

Similarly from equations (3) and (4), and equations (5) and (6), by equating R1 and R2 respectively, $$e1-X1=i1-T1$$

$$e2-X2=i2-T2$$

Thus, $$T1=i1-e1+X1$$

$$T2=i2-e2+X2$$

And in general, $$T[n]=i[n]-e[n]+X[n]$$

If the connected communications element adheres to a known standard, or there is a definable skew relationship between the lanes, then the X[n] skew values can be related. In turn, this allows the T[n] values to be related to each other as well. For instance, if the relationship between the X[n] values is assumed to be ideal then X[n] can be equated to a single variable (X) i.e., $$X[n]=X$$

$$T0=i0-e0+X$$

$$T1=i1-e1+X$$

$$T2=i2-e2+X$$

By taking T0 (the transmit skew for MGT_0) as a reference, it is shown that T1 can be found relative to this skew, and similarly, T2 can be found relative to T0's skew. Equating X's, $$T0-i0+e0=T1-i1+e1=T2-i2+e2$$

Thus, T1 and T2 can be expressed in terms of T0 as, $$T1=T0+i1-i0-e1+e0$$

$$T2=T0+i2-i0-e2+e0$$

In general, $$T[n]=T0+i[n]-i0-e[n]+e0$$

By following this process, all skew values for each transmit lane can be determined relative to a single reference lane. Once the skew for each transmit lane is known, relative to this single lane, then the appropriate amount of skew can be injected into each lane to provide total lane alignment in compliancy with relevant standards, such as Sxl-5. In order to accomplish this, the resolution of the receiver (typically 0.5 UI due to the RX PLL CDR, where UI is a Unit Interval of Time), and any other uncertainties added, have to be accounted for and be within the allowable skew values for the standard.

Figure 2:
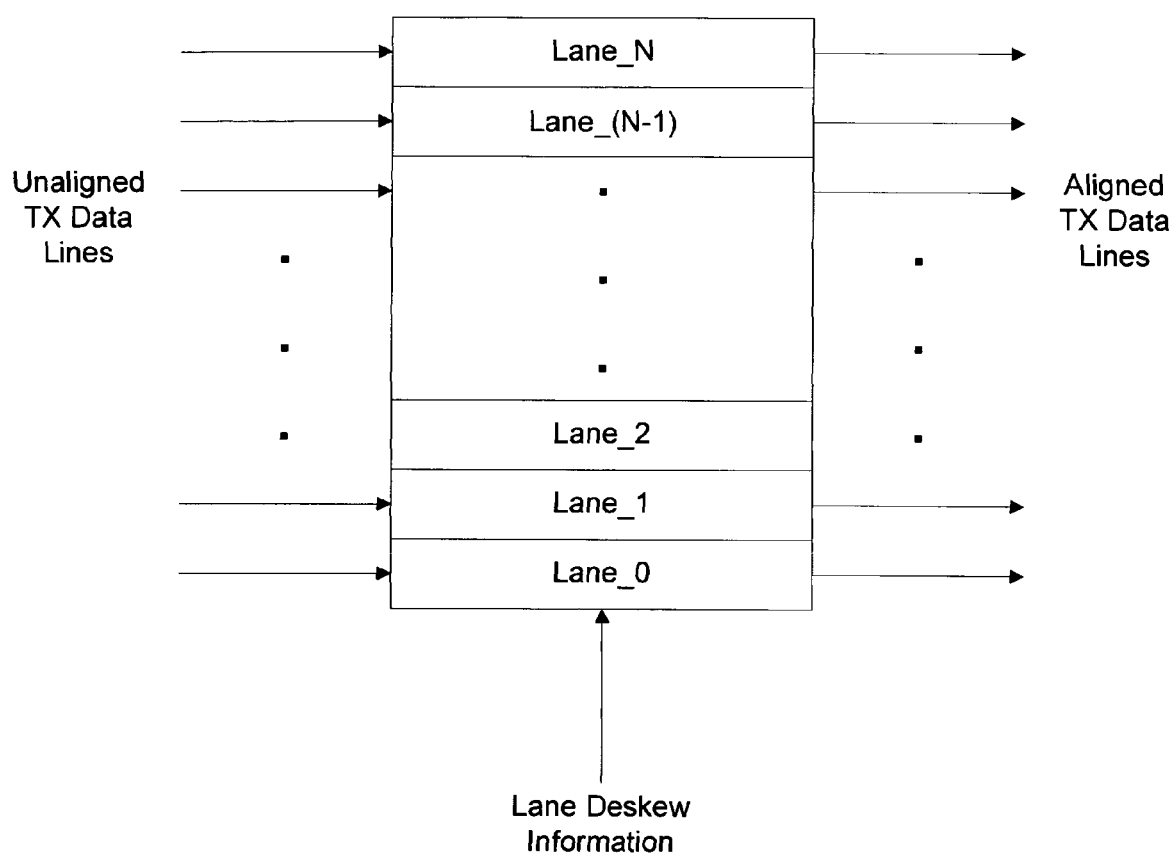
FIG. 2 is a block diagram of how the skew injection technique may be implemented.

In order to inject the appropriate amount of skew into each lane to provide lane alignment, the unaligned transmit (TX) data lines enter a buffer, such as a First-In-First-Out (FIFO) buffer, for the purposes of lane deskewing. The skew values to be injected for each lane are supplied to the buffer. The buffer then shifts each lane the appropriate amount to ensure lane-to-lane alignment. A representation of a possible embodiment of this injection system is shown in FIG. 2. The output from the buffer is the aligned TX data lines, which can then be categorized as being within skew specifications for relevant standards.

REFERENCES CITED

U.S. Patent Documents

| | | | |
|---|---|---|---|
| 6,557,110 | April, 2003 | Sakamoto et al. | 713/503 |
| 6,690,757 | February, 2004 | Bunton et al. | 375/371 |
| 6,820,234 | November, 2004 | Deas et al. | 714/814 |
| 6,839,862 | January, 2005 | Evoy et al. | 713/503 |
| 6,907,552 | June, 2005 | Collins | 714/700 |
| 6,920,576 | July, 2005 | Ehmann | 713/400 |
| 6,996,738 | February, 2006 | Chiang | 713/503 |

OTHER REFERENCES

OIF, System Framer Interface Level 5 (SFI-5), 29 Jan. 2002
OIF, System Interface Level 5 (Sxl-5), October 2002

What is claimed is:

1. A skew detection apparatus detecting the amount of skew in at least one of a plurality of transmitting lanes, in relation to a reference lane, of a parallel data transmission system, comprising:
   (a) a plurality of transmitting lane pairs with one of a plurality of transceivers for each of said plurality of transmitting lane pairs, said plurality of transceivers comprising a transmitter and a receiver, wherein one of said plurality of transmitting lane pairs is a reference lane and one of said plurality of transceivers is a reference transceiver;
   (b) a internal loopback coupled from one or more outputs from said transmitter to one or more inputs of said receiver via a switch, wherein said switch selects data from a plurality of data, said plurality of data comprising regular data and internal loopback data, wherein said switch selects one of said plurality of data, whereby any other of said plurality of data can subsequently be selected by said switch to change from one of said plurality of data to any other of said plurality of data;
   (c) a connected communication element coupled to a receiving chip via a chip receive path; and
   (d) a logic circuit to implement at least one equation to detect a plurality of skew constants via a mode of empirical testing, said plurality of skew constants comprising internal skew constants and external skew constants, wherein said internal skew constants are located thin said transceivers and said external skew constants are located across said chip receive path, wherein said plurality of skew constants indicate skew in any of said plurality of transmitting lane pairs.

2. The apparatus of claim 1, wherein said reference lane and said reference transceiver are chosen from said plurality of transmitting lane pairs and said plurality of transceivers or said reference lane and said reference transceiver are provided in addition to said plurality of transmitting lane pairs and said plurality of transceivers for the purpose of providing said reference lane to said plurality of transmitting lane pairs and said reference transceiver to said plurality of transceivers.

3. The apparatus of claim 1, wherein in said mode of empirical testing is a training sequence.

4. The apparatus of claim 1, wherein said receiving chip is a Field Programmable Gate Array (FPGA).

5. The apparatus of claim 1, wherein said connected communication element is a transponder or said connected communication element is a connection device for data transfer.

6. The apparatus of claim 3, wherein said training sequence is a Pseudo-Random Bit Sequence (PRBS) pattern.

7. A skew correction apparatus for correcting the amount of skew in at least one of a plurality of transmitting lanes, in relation to a reference lane, comprising:
   (a) a plurality of transmitting lane pairs with one of a plurality of transceivers for each of said plurality of transmitting lane pairs, said plurality of transceivers comprising a transmitter and a receiver, wherein one of said plurality of transmitting lane pairs is a reference lane and one of said plurality of transceivers is a reference transceiver;
   (b) a buffer to delay said plurality of transmitting lane pairs by a Unit Interval of Time (UI); and
   (c) a logic circuit to implement an equation to detect an amount of skew in at least one of said plurality of transmitting lane pairs through a plurality skew constants, said plurality of skew constants comprising internal skew constants located within said transceivers and external skew constants located across a chip receive path, said chip receive path connecting a connected communication element to a receiving chip, whereby said amount of skew indicates to said buffer the offsetting skew to be injected into any of said plurality of transmitting lane pairs, at the transmit side of the circuit, to re-align said plurality of transmitting lane pairs and achieve lane alignment.

8. The apparatus of claim 7, wherein said reference lane and said reference transceiver are chosen from said plurality of transmitting lane pairs and said plurality of transceivers or said reference lane and said reference transceiver are provided in addition to said plurality of transmitting lane pairs and said plurality of transceivers for the purpose of providing said reference lane to said plurality of transmitting lane pairs and said reference transceiver to said plurality of transceivers.

9. The apparatus of claim 7, wherein said buffer is a First-In-First-Out (FIFO) buffer.

* * * * *